United States Patent
Crowl et al.

(10) Patent No.: US 10,950,134 B1
(45) Date of Patent: Mar. 16, 2021

(54) SYSTEM AND METHOD FOR PROTECTING AGAINST IMPACT BETWEEN A MOVING VEHICLE AND A FACILITY FOR HOUSING THE VEHICLE

(71) Applicant: Loyd's Aviation, Bakersfield, CA (US)

(72) Inventors: Ryan D. Crowl, Bakersfield, CA (US); Knute F. Johnson, Art, TX (US)

(73) Assignee: Loyd's Aviation, Bakersfield, CA (US)

( * ) Notice: Subject to any disclaimer, the term of this patent is extended or adjusted under 35 U.S.C. 154(b) by 0 days.

(21) Appl. No.: 16/550,125

(22) Filed: Aug. 23, 2019

(51) Int. Cl.
| | |
|---|---|
| *G08G 5/04* | (2006.01) |
| *G08G 5/06* | (2006.01) |
| *G01S 7/481* | (2006.01) |
| *G01S 17/933* | (2020.01) |

(52) U.S. Cl.
CPC .......... *G08G 5/04* (2013.01); *G08G 5/06* (2013.01); *G01S 7/4817* (2013.01); *G01S 17/933* (2013.01)

(58) Field of Classification Search
CPC .......... G08G 5/04; G08G 5/0021; G08G 5/06; G08G 5/045; G08G 5/0078; G01S 17/933; G01S 7/4817; G01S 15/93; G01S 17/08; B64D 47/08; G05D 1/0083
See application file for complete search history.

(56) References Cited

U.S. PATENT DOCUMENTS

| | | | | |
|---|---|---|---|---|
| 3,916,588 | A * | 11/1975 | Magill | B64F 1/00 52/30 |
| 5,359,542 | A * | 10/1994 | Pahmeier | B25J 9/1615 356/621 |
| 6,816,086 | B1 | 11/2004 | Kieffer, Sr. | |
| 7,932,838 | B2 * | 4/2011 | Hamza | G08G 5/06 340/958 |
| 8,264,377 | B2 * | 9/2012 | Griffith | B64F 1/228 340/961 |
| 9,091,762 | B2 * | 7/2015 | Knight | H04N 7/181 |
| 9,469,416 | B2 * | 10/2016 | Barnes | B64D 47/08 |
| 9,865,147 | B2 | 1/2018 | Langford et al. | |
| 2008/0062011 | A1 * | 3/2008 | Butler | G01S 3/783 340/961 |

(Continued)

FOREIGN PATENT DOCUMENTS

| | | |
|---|---|---|
| CN | 204091896 U | 1/2015 |
| CN | 208251755 U | 12/2018 |

(Continued)

*Primary Examiner* — An T Nguyen
(74) *Attorney, Agent, or Firm* — Loza & Loza, LLP; David S. Sarisky (57) ABSTRACT

A method of protecting against impact between a moving vehicle and a facility housing the moving vehicle includes creating a first monitored plane relative to a first physical surface of the facility. The first monitored plane is defined by a plurality of baseline measurements. Each baseline measurement corresponds to a distance between a sensor spaced apart from the first physical surface and an object impeding a beam transmitted by the sensor, and is identified by an angle parameter. The method further includes obtaining subsequent measurements of the plurality of baseline measurements; evaluating one or more subsequent measurements relative to corresponding one or more baseline measurements to determine if a criterion indicative of an intrusion of the first monitored plane is satisfied; and activating an alarm when the criteria is satisfied.

20 Claims, 9 Drawing Sheets

(56) References Cited

U.S. PATENT DOCUMENTS

| | | | |
|---|---|---|---|
| 2008/0083851 A1* | 4/2008 | Perry | B64F 1/22 |
| | | | 244/189 |
| 2017/0294132 A1* | 10/2017 | Colmenares | G08G 5/045 |
| 2018/0004212 A1 | 1/2018 | Tang | |
| 2018/0047290 A1 | 2/2018 | Min | |
| 2019/0108763 A1* | 4/2019 | Bense | G08G 5/0078 |
| 2019/0185304 A1* | 6/2019 | Lesquir | G01S 17/87 |

FOREIGN PATENT DOCUMENTS

| | | |
|---|---|---|
| DE | 10011000 B4 | 9/2001 |
| EP | 2522621 A1 | 11/2012 |
| WO | 2017197877 A1 | 11/2017 |

\* cited by examiner

SYSTEM AND METHOD FOR PROTECTING AGAINST IMPACT BETWEEN A MOVING VEHICLE AND A FACILITY FOR HOUSING THE VEHICLE

TECHNICAL FIELD

The present disclosure relates generally to protecting against impact between a moving vehicle and a facility for housing the vehicle, and more particularly, to systems and methods that protect the structural integrity of both aircraft and aircraft facilities, such as hangars, as aircraft are moved around within such facilities.

BACKGROUND

Aviation ground handlers move aircraft of all shapes and sizes hundreds of thousands of times each day; across ramps, in and out of hangars, and to and from maintenance facilities. While usually done safely, aircraft under tow occasionally impact buildings, hangars, other aircraft, or equipment. "Hangar rash," as it is commonly referred to, is thought to be the largest source of damage to the worlds fleet of aircraft. Insurance company claims easily extend into the hundreds of thousands of dollars in damages per incident. Many more incidents go unclaimed.

Figure 1A:
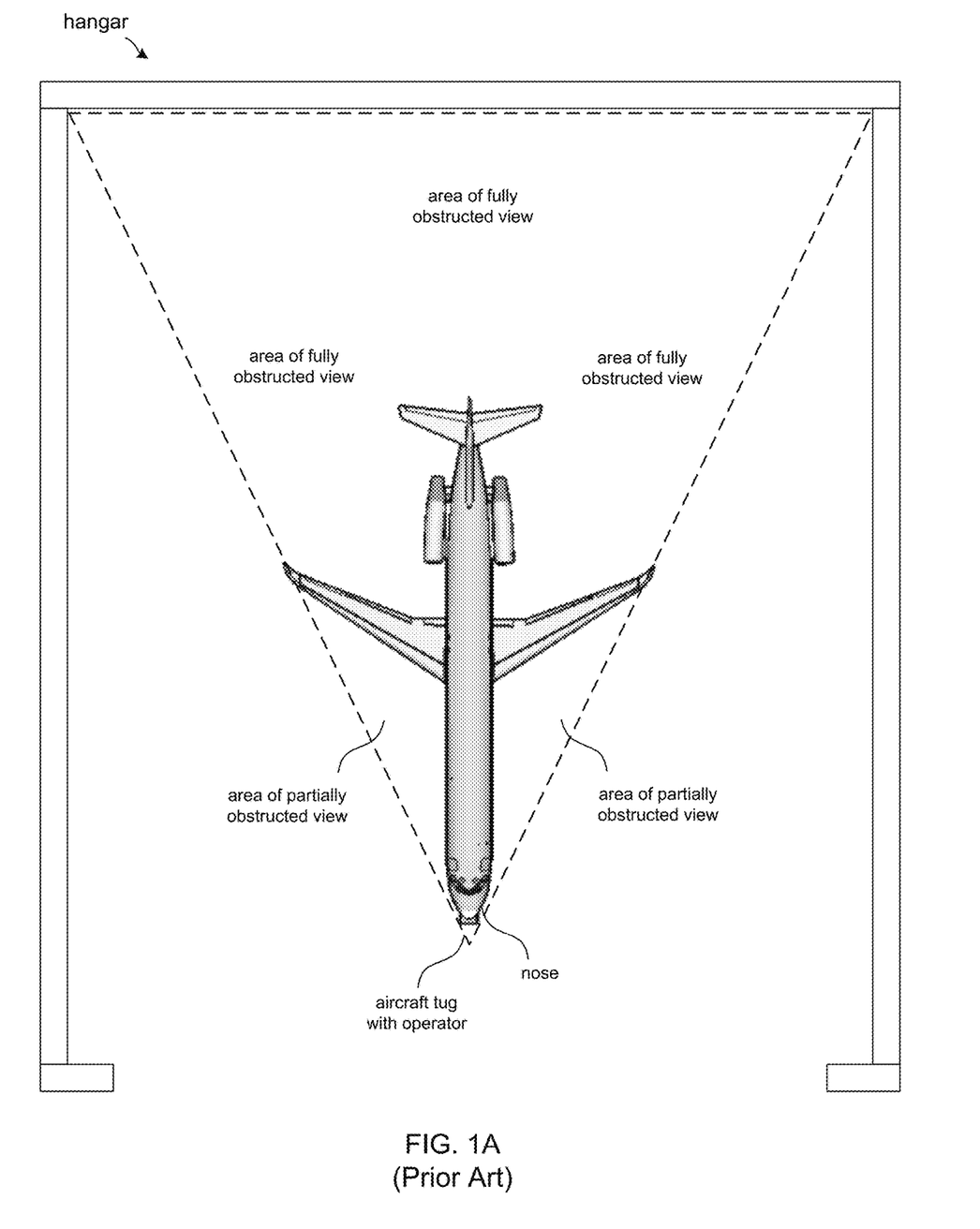
FIG. 1A is a schematic illustration of a hangar with the roof removed to make visible an aircraft positioned in the hangar and areas of partial and full visual obstruction relative to an aircraft tug at the nose of the aircraft.

With reference to FIG. 1A, an aircraft located within a hangar may be towed about the hangar by an aircraft tug under control of an aircraft tug operator. The aircraft tug and operator are situated at the nose of the airplane. As such, the view of the operator in the direction of the tail of the airplane is partially obstructed is areas between the nose and the wings, and fully obstructed in areas beyond the wings. In addition, depth perception is difficult at the distances associated with the size of larger aircraft, all of which makes it difficult to see the wings and tail.

Figure 1B:
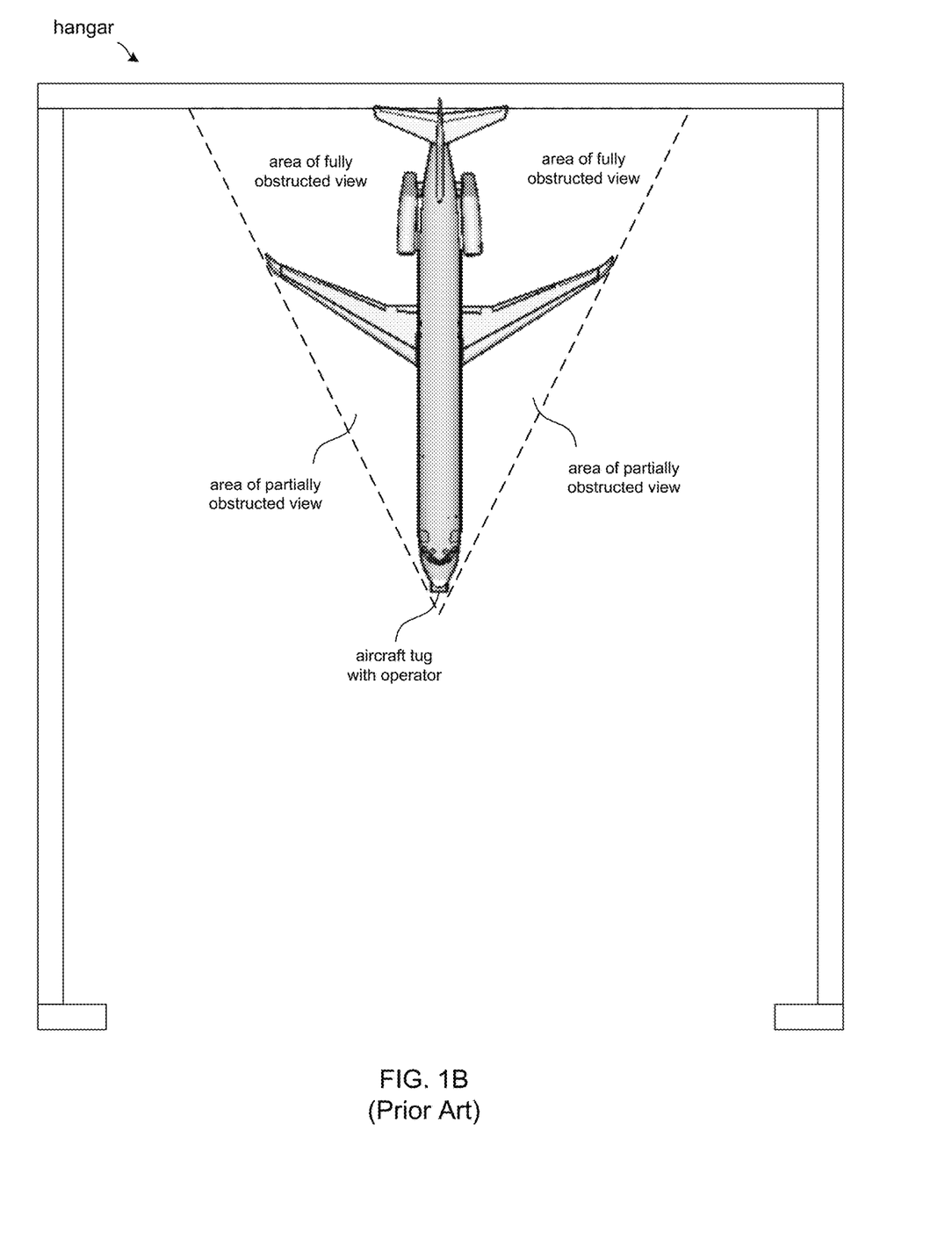
FIG. 1B is a schematic illustration of the hangar of FIG. 1A, wherein the aircraft has been repositioned in a manner that results in an impact between the back surface or wall of the hangar and the tail of the aircraft.

With reference to FIG. 1B, because of the obstructed views the aircraft tug operator may inadvertently over tow the airplane toward the back wall of the hangar thereby causing the tail to impact the back wall. Such impact may result in damage to one or both of the aircraft and the hangar wall.

It is therefore desirable to assist aircraft tug operators to prevent incidents of over towing and protect against impact between aircraft and the facilities that house aircraft. The concepts disclosed below address these needs and others.

SUMMARY

The system and method described herein are designed to provide advanced notice to ground crew members, moving aircraft under tow within a facility, when a collision with a structure of the facility or an object within the facility is imminent. The system and method act as an early detection and warning system to notify ground crew members when a part of the aircraft under tow is within a pre-determined distance of a structure or object. The system and method provides both visual and aural warnings to alert ground crew members of an impending collision.

In one aspect of the disclosure, a method of protecting against impact between a moving vehicle and a facility housing the moving vehicle includes creating a first monitored plane relative to a first physical surface of the facility. The first monitored plane is defined by a plurality of baseline measurements. Each baseline measurement corresponds to a distance between a sensor spaced apart from the first physical surface and an object impeding a beam transmitted by the sensor, and is identified by an angle parameter. The method further includes obtaining subsequent measurements of the plurality of baseline measurements; evaluating one or more subsequent measurements relative to corresponding one or more baseline measurements to determine if a criterion indicative of an intrusion of the first monitored plane is satisfied; and activating an alarm when the criteria is satisfied.

In another aspect of the disclosure, a system for protecting against impact between a moving vehicle and a facility for housing the moving vehicle, includes a measurement module, a learning module, and a detection modules. The measurement module is adapted to be spaced apart from a first physical surface of the facility and is configured to rotate relative to the first physical surface, and obtain a plurality of measurements, wherein each measurement corresponds to a distance between the measurement module and an object impeding a beam transmitted by the measurement module.

The learning module is coupled to the measurement module and configured to receive a plurality of measurements from the measurement module corresponding to a plurality of baseline measurements; associate an angle parameter with each of the plurality of baseline measurements; and create a first monitored plane relative to the first physical surface. The first monitored plane is defined by the plurality of baseline measurements and corresponding angle parameters.

The detection module is coupled to the measurement module and is configured to obtain one or more measurements from the measurement module, each corresponding to a subsequent measurement; associate an angle parameter with each of the one or more subsequent measurements; evaluate the one or more subsequent measurements relative to one or more baseline measurements having a same angle parameter to determine if a criteria indicative of an intrusion of the first monitored plane is satisfied; and output an alarm activation signal when the criteria is satisfied.

It is understood that other aspects of apparatuses and methods will become readily apparent to those skilled in the art from the following detailed description, wherein various aspects of apparatuses and methods are shown and described by way of illustration.

BRIEF DESCRIPTION OF THE DRAWINGS

Various aspects systems and methods will now be presented in the detailed description by way of example, and not by way of limitation, with reference to the accompanying drawings, wherein.

DETAILED DESCRIPTION

Disclosed herein is a protection system and method that protects against impact between a moving vehicle and a facility housing the vehicle. For example, the system and method may protect large physical surfaces, e.g., walls, of a hangar facility from accidental impact by an aircraft under tow. Using a network of sensors placed a distance from a wall, the protection system creates a corresponding network of virtual walls or monitored planes, each spaced apart in a parallel arrangement with a wall. Once this network of monitored planes is created, the protection system uses the same network of sensors to monitor for penetration or intrusion of a monitored place by an object, e.g. person, aircraft, ground support vehicle, etc. If a monitored plane is penetrated, the system and method activate an aural and visual alarm to signal the tug operator of a potential impact between the object and the physical wall of the facility.

Figure 2:
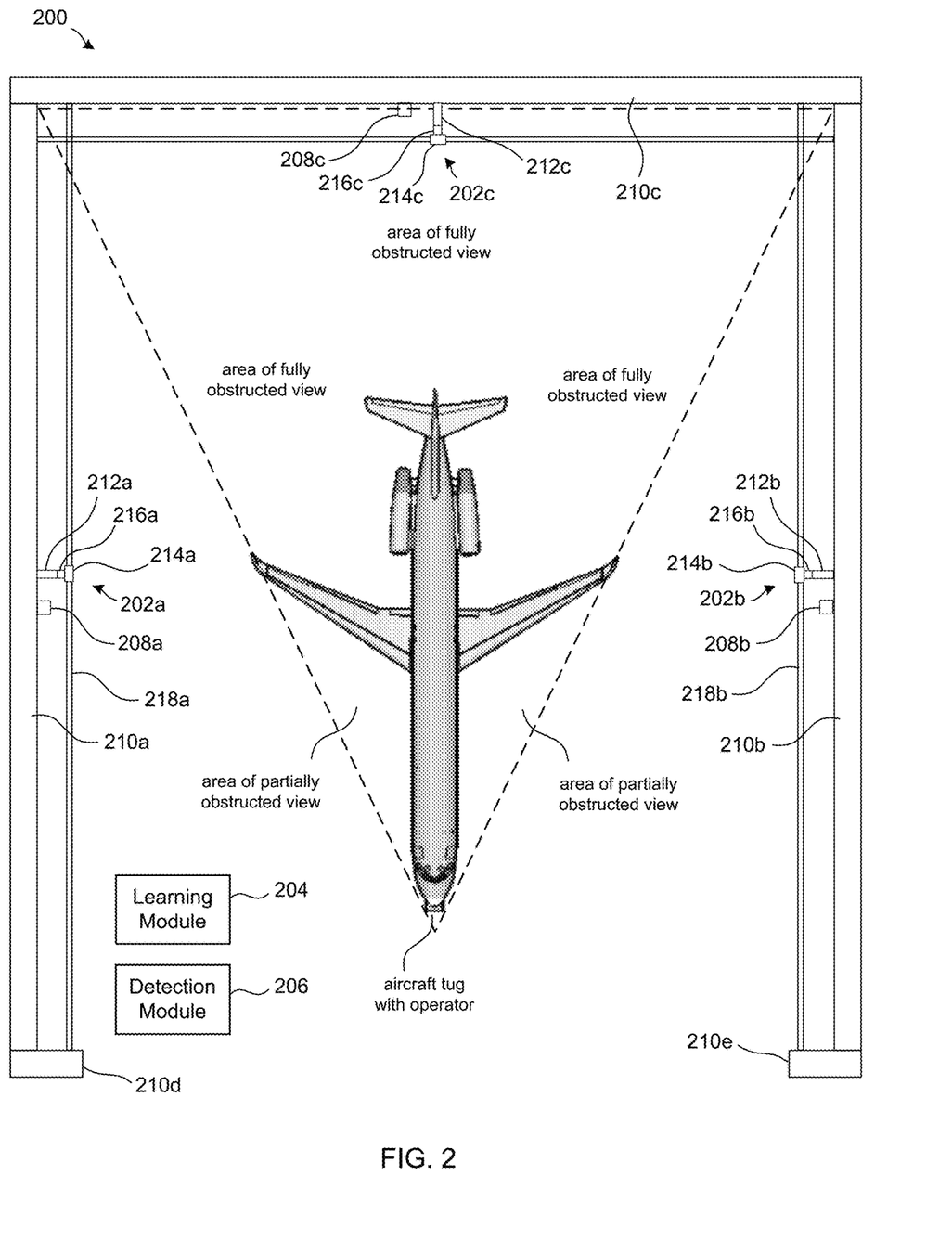
FIG. 2 is a schematic illustration of a hangar with the roof removed to make visible an aircraft positioned in the hangar and a protection system having three veils or monitored planes that create protected areas adjacent physical surfaces of the hangar.
Figure 3:
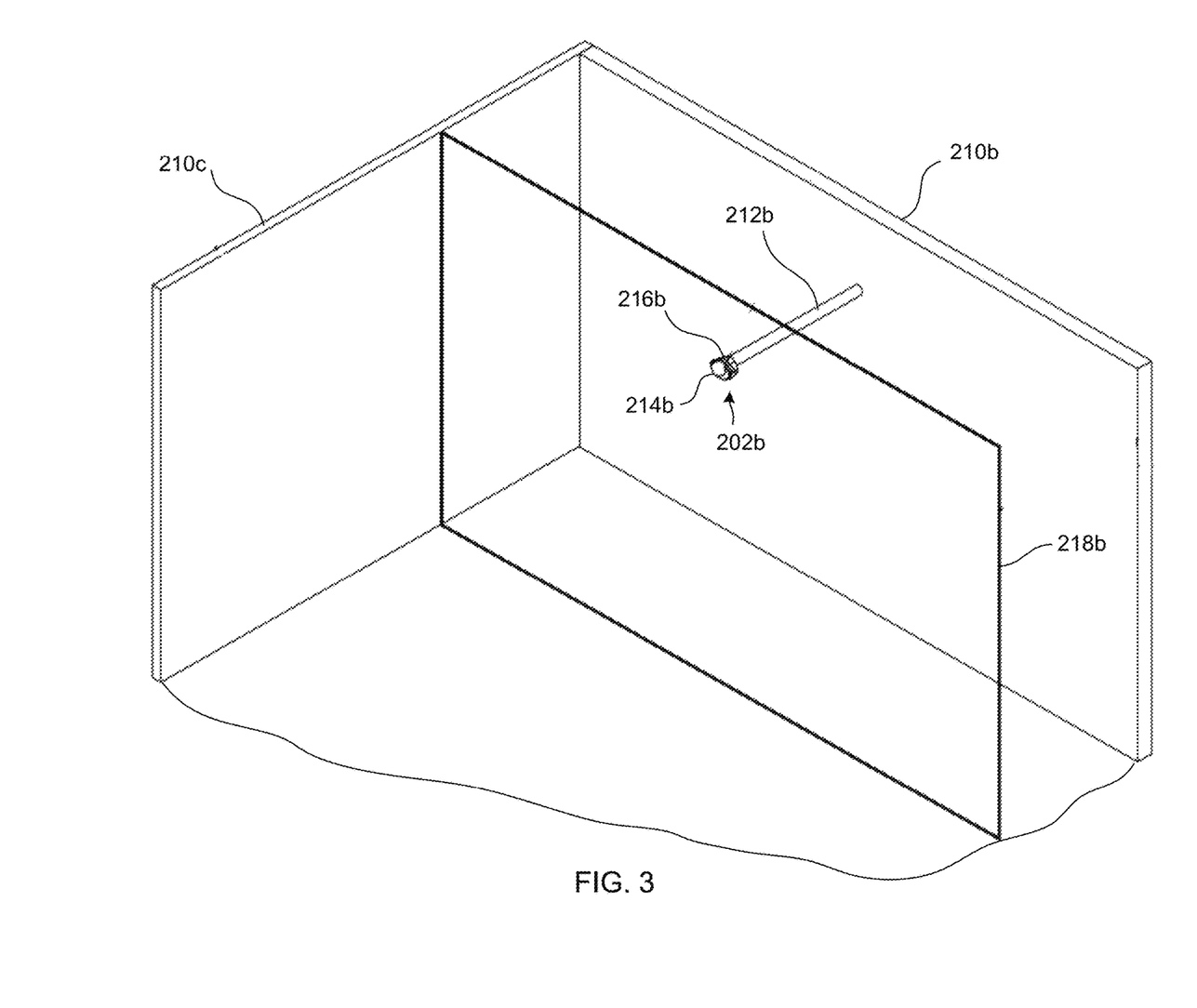
FIG. 3 is an isometric illustration of a monitored plane that creates a protected area adjacent a physical surface.

With reference to FIGS. 2 and 3, an example protection system 200 installed in an aircraft hangar and configured in accordance with the concepts disclosed herein includes three measurement modules 202a, 202b, 202c, a learning module 204, a detection module 206, and three alarm modules 208a, 208b, 208c. While the learning module 204 and detection module 206 are shown separately, they may be embodied in a single controller in the form of a microprocessor programmed to implement the features of the protection system 200 described herein.

The modules of the protection system 200 are communicatively coupled together to allow information and data from the measurement modules 202a, 202b, 202c to reach the learning module 204 and the detection module 206, and to allow control signals from learning module 204 to reach the measurement modules 202a, 202b, 202c, and control signals from the detection module 206 to reach the alarm modules 208a, 208b, 208c. The communication coupling may be wired or wireless.

As shown in FIG. 2, each of the measurement modules 202a, 202b, 202c is associated with a respective physical surface of the hangar. For example, the first measurement module 202a is associated with a first sidewall 210a of the hangar, the second measurement module 202b is associated with a second sidewall 210b of the hangar, and the third measurement module 202c is associated with a backwall 210c of the hangar. The respective associations between the measurement modules 202a, 202b, 202c and the walls 210a, 201b, 210c places the measurement modules in a spaced apart relationship with the wall. To this end, each measurement modules 202a, 202b, 202c may be located on a pole 212a, 212b, 212c or rod that projects outward from the wall 210a, 201b, 210c.

Each of the measurement modules 202a, 202b, 202c includes a sensor 214a, 214b, 214c that is configured to provide distance measurements between itself and objects near the sensor. These objects may be, for example, hangar surfaces including walls, the floor, the ceiling, or other structures within the hangar, such as tables, shelves, a parked ground support vehicle. Each of the measurement modules 202a, 202b, 202c also includes a rotation mechanism 216a, 216b, 216c configured to rotate the sensor 214a, 214b, 214c at a particular rotation rate. To this end, each sensor 214a, 214b, 214c is associated with a motor 216a, 216b, 216c that rotates under the control of the learning module 204 or the detection module 206. Rotation of the motor translates to rotation of the sensor 214a, 214b, 214c at the rotation rate.

Continuing with FIG. 2, each of the alarm modules 208a, 208b, 208c is associated with a respective physical surface of the hangar. For example, the first alarm module 208a is associated with a first sidewall 210a of the hangar, the second alarm module 208b is associated with a second sidewall 210b of the hangar, and the third alarm module 208c is associated with a backwall 210c of the hangar. In an alternative configuration, the alarm modules 208a, 208b, 208c are integrated with a respective measurement modules 202a, 202b, 202c.

With reference to FIGS. 2 and 3, during a learning phase of the protection system 200, each of the sensors 214a, 214b, 214c provides a set of baseline distance measurements to the learning module 204. From each set of baseline measurements, the learning module 204 creates a corresponding monitored plane 218a, 218b, 218c that is spaced apart from a respective surface 210a, 210b, 210c. These monitored planes 218a, 218b, 218c are not physical in nature, but are instead virtual planes, each of which is bound by its adjacent hangar surfaces 210a, 210b, 210c, 210d, 210e, the floor of the hangar and the ceiling of the hangar, and any other structures, e.g., tables, shelves, parked ground support vehicle, that are detected by the sensor. These monitored planes 218a, 218b, 218c are defined by a set of baseline measurements. The distance between each surface 210a, 210b, 210c and its respective monitored plane 218a, 218b, 218c defines a protected area within the hangar. These distances are defined by the length of the pole 212a, 212b, 212c to which the sensors 214a, 214b, 214c are attached. The distance is typically in the range of 2 to 5 feet.

During a detection phase of the protection system 200, subsequent distance measurements are provided to the detection module 206. From these subsequent measurements, the detection module 206 determines if an object has breached or crossed through a monitored plane 218a, 218b, 218c. If a breach or intrusion has occurred, the detection module 206 outputs an activation signal to a corresponding alarm module 208a, 208b, 208c. The alarm module 208a, 208b, 208c may be visual or aural in nature. For example, the alarm module 208a, 208b, 208c may include lights configured to flash and/or speakers configured to output an alarm sound.

Having thus described the configuration and operation of the protection system 200 at a general level, a more detailed description follows.

Figure 4:
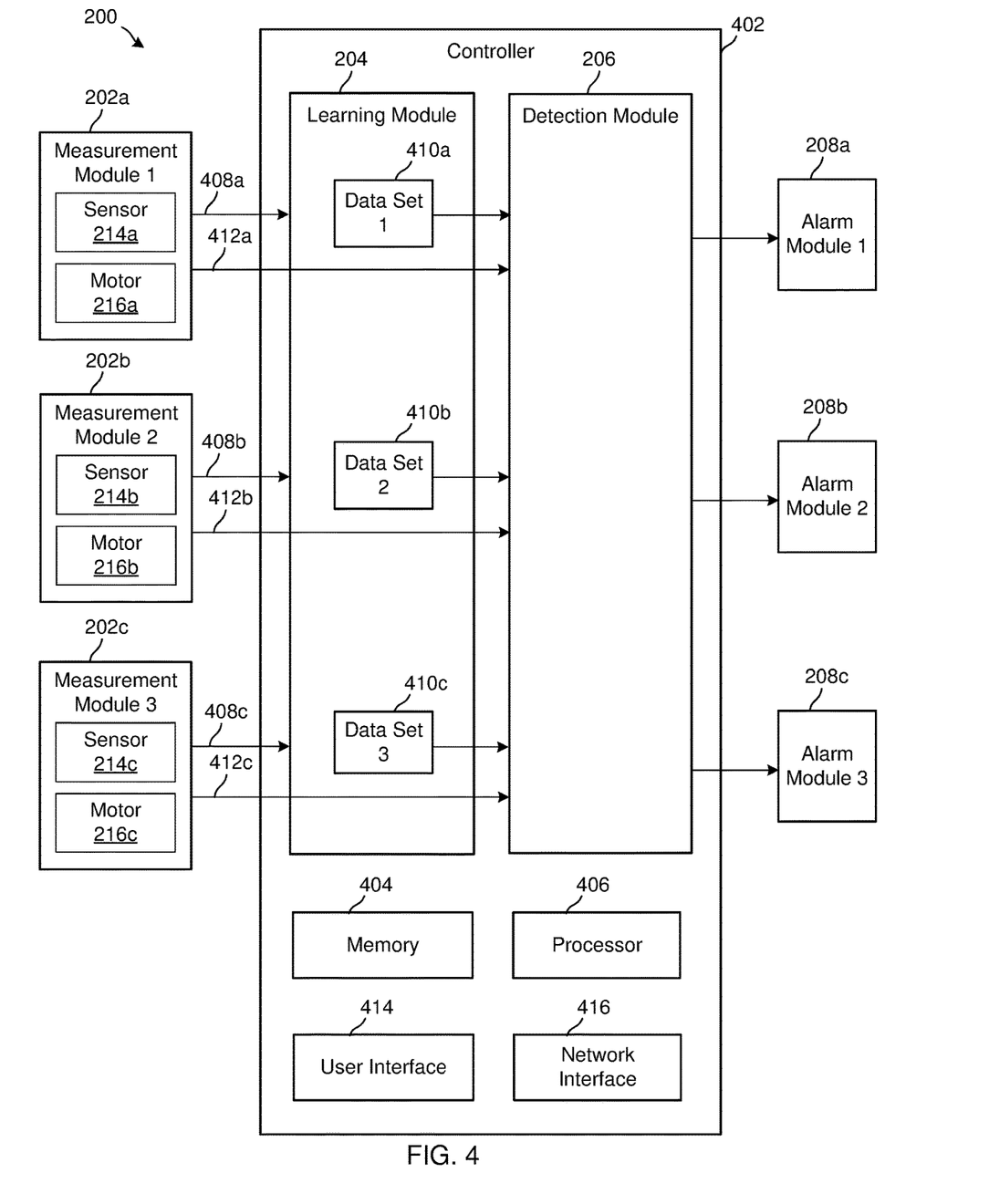
FIG. 4 is block diagram of a protection system including measurement modules, a learning module, a detection module and alarm modules.

With reference to FIG. 4, the protection system 200 includes one or more measurement modules 202a, 202b, 202c, a learning module 204, a detection module 206, and one or more alarm modules 208a, 208b, 208c. The number of measurement modules 202a, 202b, 202c and alarm modules 208a, 208b, 208c corresponds to the number of surfaces of the facility for which protection is sought. Thus, while only three measurement modules 202a, 202b, 202c and alarm modules 208a, 208b, 208c for protecting three surfaces are shown in FIG. 4, more or less modules may be included in a protection system 200. The learning module 204 and the detection module 206 may be embodied in a single controller 402 having a memory 404 and a processor 406 programmed to implement the features of the learning module 204 and the detection module 206 as disclosed herein.

As described above, each of the measurement modules 202a, 202b, 202c includes a sensor 214a, 214b, 214c that is configured to provide distance measurements between itself and objects, e.g., hangar surfaces, ceiling, floor, etc., near the sensor. Each sensor 214a, 214b, 214c in turn, is associated with a motor 216a, 216b, 216c that is configured to rotate at a particular rotation rate in accordance with a control signal output by the controller 402.

In one configuration, the sensor 214a, 214b, 214c is a light detection and ranging (LIDAR) sensor that utilizes a pulsed laser light and time of flight calculations to determine distance measurements. An example LIDAR sensor 214a, 214b, 214c that may be employed by the protection system 200 is a RPLIDAR A3 sensor manufactured by Slamtec. In another configuration, the sensor 214a, 214b, 214c may be a RPLIDAR A2 sensor, also manufactured by Slamtec. In either configuration, the sensor 214a, 214b, 214c is configured to output data 408a, 408b, 408c corresponding to distance measurements at a programmable rate. For example, the sensors 214a, 214b, 214c may be programmed to output distance measurements 408a, 408b, 408c at a rate of one per one-thirty-six-hundredths ($1/3600$) of a second, which equates to 3600 measurements per second.

The learning module 204 receives distance measurements 408a, 408b, 408c from each of measurement modules 202a, 202b, 202c and creates a monitored plane based on these measurements. As noted above, the monitored planes 218a, 218b, 218c shown in FIGS. 2 and 3 are not physical in nature, but instead are virtual planes, each having a perimeter defined by a set of distance measurements 408a, 408b, 408c received from a measurement module 202a, 202b, 202c and a corresponding set of angle parameters that are assigned by the learning module 204. Thus, the monitored planes 218a, 218b, 218c created by the learning module 204 are structured as data sets 410a, 410b, 410c, where each instance or data point in the data set is defined by a distance measurement 408a, 408b, 408c and an angular measurement. These data sets 410a, 410b, 410c may be stored in the memory 404 of the controller 402.

To determine the data points in these data sets 410a, 410b, 410c, the learning module 204 is configured to control rotation of the motor 216a, 216b, 216c of each respective measurement module 202a, 202b, 202c so its associated sensor rotates at a set rate. For example, the learning module 204 may be programmed to output a control signal to each motor 216a, 216b, 216c that causes the motor and it associated sensor 214a, 214b, 214c to rotate once, or 360 degrees, per second. Thus, rotating at a rate of 360 degrees per second and providing distance measurements 408a, 408b, 408c at a rate of 3600 per second, the measurement modules 202a, 202b, 202c provide 3600 distance measurements for each 360 degree rotation of the sensor. In other words, the measurement modules 202a, 202b, 202c provide a distance measurement 408a, 408b, 408c every one-tenth of a degree of rotation.

Figure 5:
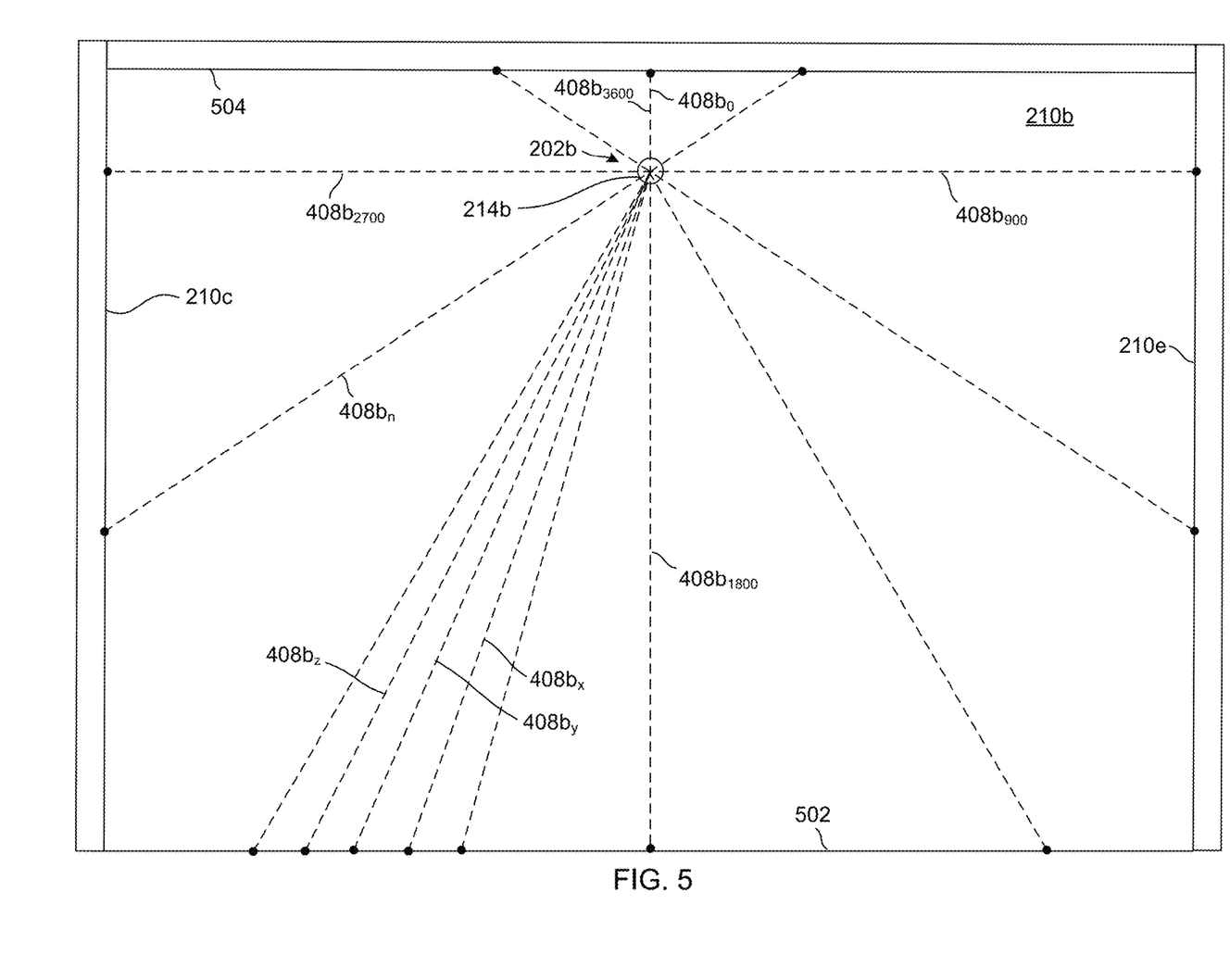
FIG. 5 is a plan view of a monitored plane relative to a pair of physical side surfaces, a floor and a ceiling, and showing a number of baseline measurements that define the monitored plane.

Acquisition of a set of distance measurements for one physical surface is described further with reference to FIG. 5, which illustrates distance measurements $408b_n$ obtained by the measurement module 202b and sensor 214b associated with the surface 210b. While a large number, e.g., 3600, of such distance measurements per revolution may be obtained, for ease of illustration, a limited number of distances are shown in FIG. 5. Each of the distance measurements $408b_n$ corresponds to distance between the sensor 214b and an object in the line of sight of the laser pulse beam output by the sensor. These objects in the line of sight may be, for example, a sidewall 210c adjacent to the surface 210b, a floor 502, a ceiling 504, or a front wall 210e.

Assuming the sensor 214b is directed to output its first laser pulse beam at 0 degrees that aligns with 12 o'clock, and rotates one revolution per second clockwise or 360 degrees back to 12 o'clock outputting a laser pulse beam every one-thirty-six-hundredths ($1/3600$) of a second, the sensor will provide a first distance measurement $408b_0$ at 12 o'clock, a $900^{th}$ distance measurement $408b_{900}$ 0.25 seconds later at 3 o'clock, a $1800^{th}$ distance measurement $408b_{1800}$ 0.5 seconds later at 6 o'clock, a $2700^{th}$ distance measurement $408b_{2700}$ 0.75 seconds later at 9 o'clock and a $3600^{th}$ distance measurement $408b_{3600}$ 1 seconds later at 12 o'clock.

Associated with each of these 3600 distance measurements is an angle parameter that identifies the angle at which the distance measurement was obtained. For example, continuing with the example of FIG. 5, the parameter associated with the first distance measurement $408b_0$ may be 0 degrees, the parameter associated with the $900^{th}$ distance measurement $408b_{900}$ may be 90 degrees, the parameter associated with the $1800^{th}$ distance measurement $408b_{1800}$ may be 180 degrees, the parameter associated with the $2700^{th}$ distance measurement $408b_{2700}$ may be 270 degrees, and the parameter associated with the $3600^{th}$ distance measurement $408b_{3600}$ may be 360 degrees.

The learning module 204 receives distance measurements 408b from the measurement module 202b over a period of time or for a number of rotations of the sensor 214b, until a valid data set for the monitored plane 218b is obtained. To this end, the learning module 204 may collect a set of distance measurements 408b for each angular measurement or angle parameter and then apply a selection criterion or statistical analysis to each set of distance measurements to derive a valid data point for each angular measurement.

In one configuration, the learning module 204 derives a valid data point for each angle by selecting the nearest or shortest distance measurement 408b from the set of distance measurements obtained for that angle, as the valid distance measurement for that angle. For example, if a set of five distance measurements 408b are obtained for each angle by five rotations of the sensor 214b, the learning module 204 compares the five distance measurements associated with each particular angle and selects the shortest distance as the valid distance measurement for that particular angle.

In another configuration, the learning module 204 derives a valid data point for each angle by averaging the distance measurements 408b included in the set of distance measurements obtained for that angle. For example, if a set of five distance measurements 408b are obtained for each angle by five rotations of the sensor 214b, the learning module 204 calculates the average of the five distance measurements associated with each particular angle and defines the average as the valid distance measurement for that particular angle.

In the example of FIG. 5, the resulting data set 410b comprises 3600 instances or data points, each defined by a distance measurement and an angle parameter. The data sets 410a, 410c for other physical surfaces 210a, 210c are acquired in the same way. Portions of an example data set are provided in Table 1.

TABLE 1

| Angle parameter (degree of rotation) | Distance measurement (millimeters) |
|---|---|
| 90.0 | 5719 |
| 90.1 | 5719 |
| 90.2 | 5722 |
| 90.3 | 5737 |
| 90.4 | 5761 |
| 90.5 | 5783 |
| 90.6 | 5789 |
| 90.7 | 5796 |
| 90.8 | 5802 |
| 90.9 | 5805 |
| ⋮ | ⋮ |
| 359.0 | 3729 |
| 359.1 | 3694 |
| 359.2 | 3684 |
| 359.3 | 3684 |
| 359.4 | 3676 |
| 359.5 | 3669 |
| 359.6 | 3671 |
| 359.7 | 3664 |
| 359.8 | 3669 |
| 359.9 | 3661 |

It is noted that the shape, material, and reflectivity properties of the physical surfaces, and the relative angle between the physical surfaces and the sensor 214b laser beam may impact the ability of the sensor to obtain distance measurements 408b at certain angles. As a result, valid distance measurements may not be obtainable at every angle in a data set 410b.

To address this scenario, the learning module 204 may be programmed to determine a data set 410b is valid when the learning module has obtained valid distance measurements 408b for a percentage of the total number of possible data points. For example, the learning module 204 may declare a data set 410b valid when the number of data points learned is between 85% and 95% of the total number of possible data points. In the case of 3600 data points and a 90% threshold, the learning module declares a data set valid when the module has learned 3240 data points.

To further address the scenario where valid distance measurements are not obtainable at every angle in a data set 410b, the learning module 204 may be configured to derive these unobtainable distance measurements based on valid distance measurements included in the data set 410b. To this end, the learning module 204 may derive an unobtainable distance measurement for a particular angle by locating valid distance measurements in the data set on either side of the particular angle and calculating the average of these measurements. For example, with reference to Table 1, assuming the distance measurement for angle 359.5 was unobtainable, the learning module 204 may locate the distance measurements for angles 359.4 and 359.6, calculate the average, and insert that average into the data set 410b as the distance measurement for angle 359.5.

Once the data sets 410a, 410b, 410c are established, the detection module 206 begins to receive subsequent measurements 412a, 412b, 412c from each of measurement modules 202a, 202b, 202c and evaluates the subsequent measurements relative to the baseline measurements. To this end, the detection module 206 is configured to control rotation of the motor 216a, 216b, 216c of each respective measurement module 202a, 202b, 202c so its associated sensor rotates at a set rate corresponding to the same rate used to collect the baseline measurements. For example, the detection module 206 may be programmed to output a control signal to each motor 216a, 216b, 216c that causes the motor and it associated sensor 214a, 214b, 214c to rotate 360 degrees per second. Thus, rotating at a rate of 360 degrees per second and providing distance measurements 412a, 412b, 412c at a rate of 3600 per second, the measurement modules 202a, 202b, 202c provide 3600 distance measurements for each 360 degree rotation of the sensor. In other words, the measurement modules 202a, 202b, 202c provide a distance measurement 412a, 412b, 412c every one-tenth of a degree of rotation.

Figure 6:
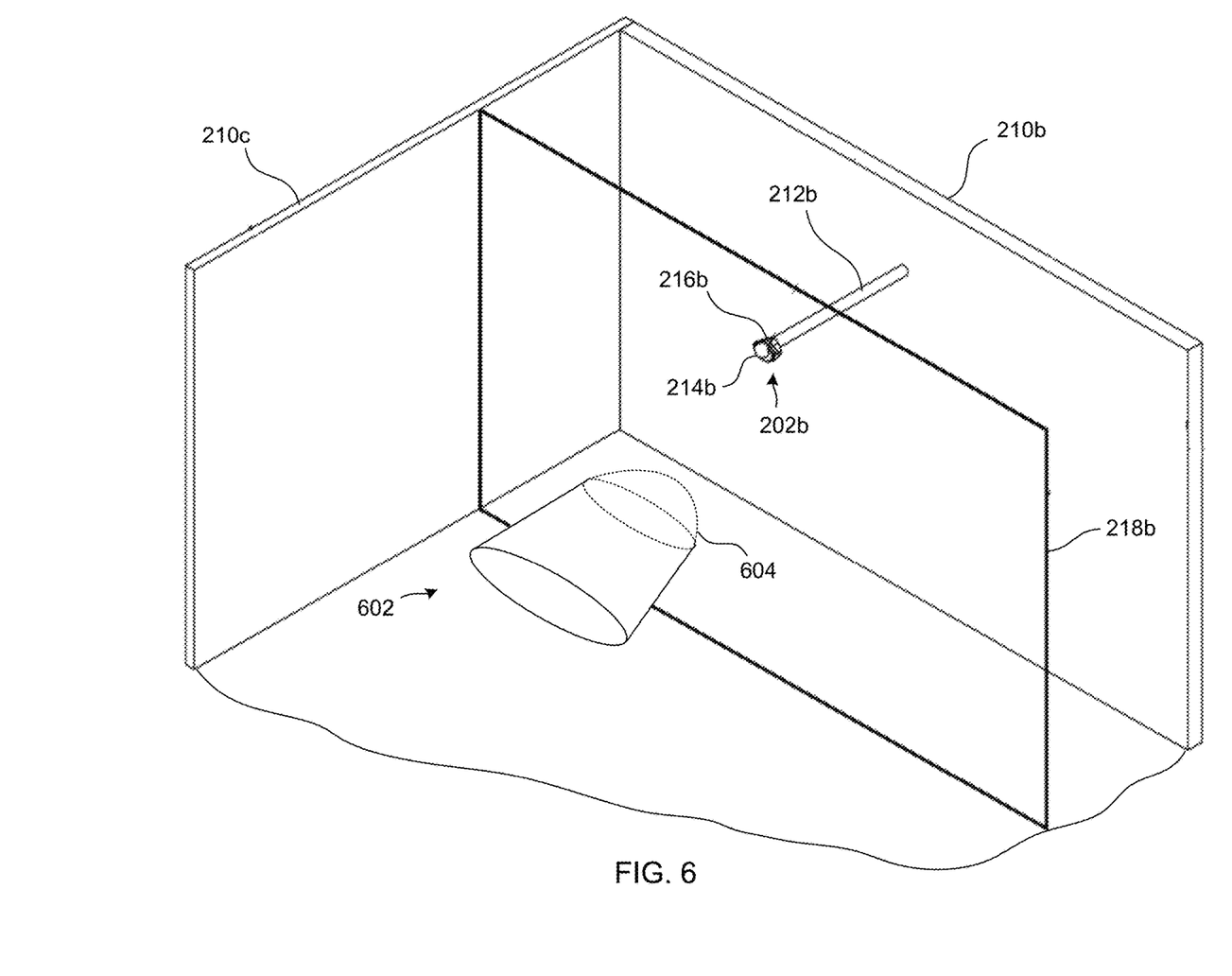
FIG. 6 is an isometric illustration of the monitored plane of FIG. 3 breached by an object.

For each surface 210a, 210b, 210c protected by a monitored plane 218a, 218b, 218c, the detection module 206 may evaluate subsequent measurements 412a, 412b, 412c provided by the measurement module 202a, 202b, 202c associated with that surface relative to its baseline measurements 408a, 408b, 408c to determine if an object has penetrated or intruded the monitored plane. With reference to FIG. 6, an object 602 is considered to breach or intrude a monitored plane 218b when a part 604 or portion of it pass through the plane. The object 602 may be, for example, a tip of an aircraft wing. The detection module 206 detects such intrusions by comparing, in real time, one or more subsequent measurements 412a, 412b, 412c to corresponding baseline measurements 408a, 408b, 408c to determine an intrusion state for each monitored plane.

Figure 7:
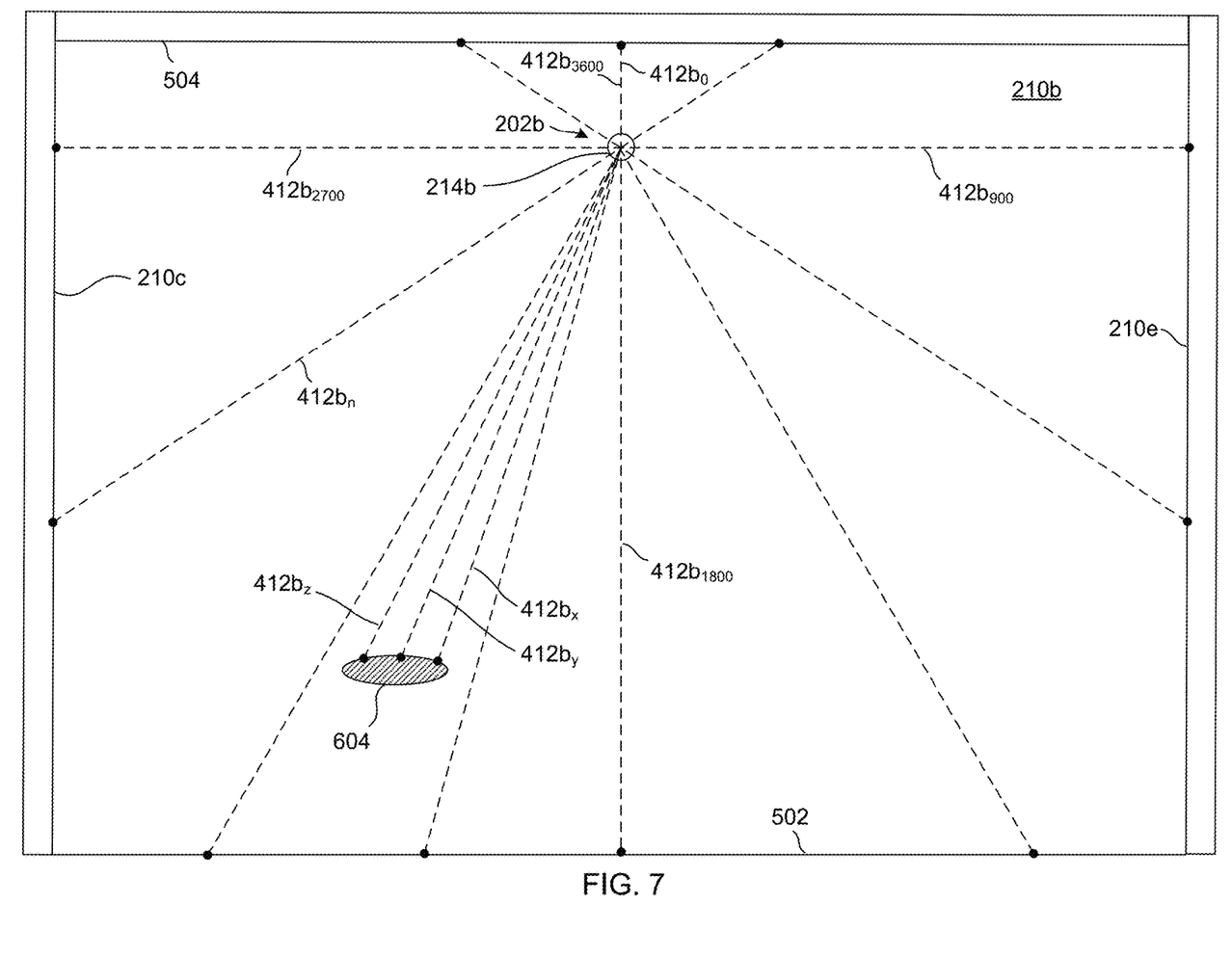
FIG. 7 is a plan view of a monitored plane and a cross-section of an object breaching the monitored plane, and showing a number of subsequent measurements that indicate an intrusion of the monitored plane.

Acquisition of subsequent measurements for one physical surface is described further with reference to FIG. 7, which illustrates subsequent distance measurements $412b_n$ obtained by the measurement module 202b and sensor 214b associated with the surface 210b. While a large number, e.g., 3600, of such distance measurements $412b_n$ per revolution may be obtained, for ease of illustration, a limited number of distances are shown in FIG. 7. Each of the distance measurements $412b_n$ corresponds to a distance between the sensor 214b and an object in the line of sight of the laser pulse beam output by the sensor. Under normal conditions, these objects in the line of sight would be the same objects that were present while the baseline measurements were obtained. Such objects include, for example, a sidewall 210c adjacent to the surface 210b, a floor 502, a ceiling 504, or a front wall 210e. In FIG. 7, however, a part 604 of an object that was not present during baseline measuring is in the line of sight of a set of three laser pulse beams output by the sensor 214b. This causes the subsequent measurements $412b_x$, $412b_y$, $412b_z$ to be different in value from their corresponding baseline measurements $408b_x$, $408b_y$, $408b_z$ shown in FIG. 5. Based on these differences in measurements the detection module 206 may conclude that an intrusion of the monitored place 218b has occurred.

In one configuration, the detection module 206 may conclude that an intrusion of a monitored plane 218a, 218b, 218c occurred when any one of the subsequent measurements $412b_x$, $412b_y$, $412b_z$ is less than a value that is based on its corresponding baseline measurement $408b_x$, $408b_y$, $408b_z$. In one embodiment the value is equal to the corresponding baseline measurement itself. In this case, an intrusion is concluded to occur when a subsequent measurements $412b_x$, $412b_y$, $412b_z$ is less than its corresponding baseline measurement $408b_x$, $408b_y$, $408b_z$. In another embodiment, the value is equal to the corresponding baseline measurement plus a buffer measurement. For example, the buffer measurement may be 5 millimeters. Thus, in this case, an intrusion is concluded to occur when a subsequent measurements $412b_x$, $412b_y$, $412b_z$ is less than its corresponding baseline measurement $408b_x$, $408b_y$, $408b_z$ plus 5 millimeters.

In another configuration, in order to reduce false alarms, the detection module 206 may conclude that an intrusion of a monitored plane 218a, 218b, 218c occurred when a same subsequent measurement $412b_x$, $412b_y$, $412b_z$ is less than the value that is based on its corresponding baseline measurement $408b_x$, $408b_y$, $408b_z$ for a set number of consecutive measurements or over a period of time. For example, assuming a particular subsequent measurement $412b_x$ is obtained once every second, then an intrusion state may be considered present when three consecutive instances of that particular subsequent measurement $412b_x$ are less than the value that is based on its corresponding baseline measurement $408b_x$.

In yet another configuration, in order to reduce false alarms, the detection module 206 may conclude that an intrusion of a monitored plane occurred when a threshold number of subsequent measurements 412b, in a set of adjacent subsequent measurements agree that an intrusion occurred. To this end, when the detection module 206 determines that a first subsequent measurement $412b_x$ indicates an intrusion, i.e., the subsequent measurement is less than the value based on its corresponding baseline measurement, the detection module determines if one or more other subsequent measurements $412b_y$, $412b_z$ adjacent to the first subsequent measurement also indicate an intrusion. For example, the detection module 206 may evaluate five subsequent measurements 412b adjacent to the first subsequent measurement $412b_x$ and conclude that a detection occurred when at least three of the five subsequent measurements 412b also indicated an intrusion. In this case, adjacent subsequent measurements 412b are measurements that are obtained one after the other, at different angles, after the first subsequent measurement $412b_x$ that first indicated the intrusion.

Figure 8:
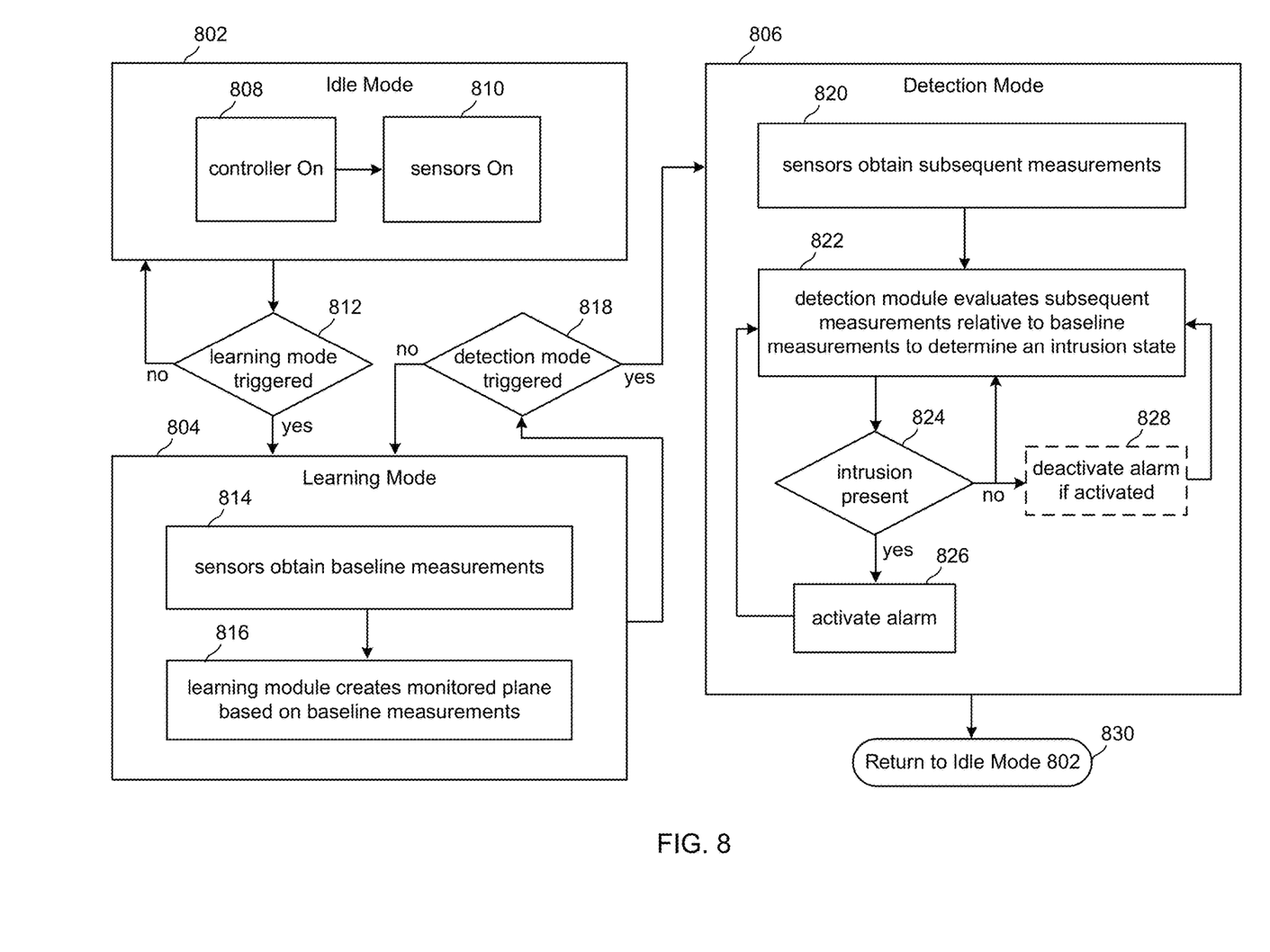
FIG. 8 is a flowchart of operation of the protection system of FIG. 4.

FIG. 8 is a flowchart of a method of protecting against impact between a moving vehicle and a facility for housing the vehicle. The method may be performed by the protection system of FIG. 4. The method comprises three general sets of steps, each corresponding to an operation mode or state of the protection system 200. These modes include an idle mode 802, a learning mode 804, and a detection mode 806.

In the idle mode 802, the system's controller 402 is powered on, but is typically not collecting or processing any data. The controller 402 is simply waiting for an input trigger, e.g., a sensor detection, activated switch, etc., to enter into another mode.

In the learning mode 804, the system's sensors rotate about a plane of rotation to obtain data points corresponding to distances between the sensor and walls, ceilings, floors, and any other object in the plane. In one configuration, the protection system 200 remains in the learning mode 804 until it has learned a pre-determined and pre-programed percentage of data points, where each data point is defined by an angle parameter and a distance measurement. The learning mode 804 results in a baseline data set of data points to compare with subsequent data points compiled during the detection mode 806. The protection system 200 may automatically switch to the detection mode 806 from learning mode 804 when it has compiled the required amount of data points in the learning mode.

As noted above, the shape, material, and reflectivity properties of the physical surfaces that the sensor is detecting, and the relative angle between these surfaces and the sensor laser beam, all play a role in how long (or how many rotational sweeps of the sensor) it takes to build a valid baseline set of data points. Since the protection system 200 is utilizing measurements at 0.1 degree increments, there are a lot of data points to compile. The sensor may not be able to learn 100% of the data in a reasonable amount of time. In some cases, distance measurements at certain degrees may not be detected by the sensor at all due to shape, material, angle and reflectivity properties of the surfaces. Therefore, the protection system 200 may be programmed to enter the detection mode 806 when it has learned a percentage of the total number of possible data points. For example, the protection system 200 may enter the detection mode 806 when the number of data points learned is between 85% and 95% of the total number of possible data points. In the case of 3600 data points and a 90% threshold, the protection system 200 enters the detection mode 806 when the system has learned 3240 data points.

Regarding missing data points, while in the detection mode 806, the protection system 200 may continue to attempt to learn these data points and add them to the baseline set of data points as they are learned. Accordingly, the sensors may continue to detect for distance measurements for the missing data points. Alternatively, the protection system 200 may derive the missing data points based on current data points adjacent to the missing data point. For example, a missing distance measurement for an angle may be derived by calculating the average of one or more distance measurements on one or both sides of the angle.

In the detection mode 806, the system's sensors obtain subsequent distance measurements and compares them to corresponding baseline distance measurements used to compile the baseline data points in learning mode 804. The controller 402 looks for any distance that is closer to the sensor than that which was recorded in the learning mode. If a new object enters the sensor's plane of rotation, the controller 402 detects that the subsequent distance at an angle is closer than the corresponding baseline distance at the same angle. The system's controller 402 may then send a signal for the attached alarms to activate, thus letting the tug operator know of a new intrusion into the plane.

Having generally described the three modes of operation, a more detailed description follows, wherein operation of the protection system 200 is within the context of a moving vehicle corresponding to an aircraft under tow and a facility corresponding to an aircraft hangar. The protection system 200, however, may operate in any other environments involving moving vehicles and related housing or storage facilities.

Continuing with FIG. 8, in the idle mode 802, at block 808 the controller 402 of the protection system 200 enters a power on state. This may occur through user operation, e.g., manually activating a power switch or button on a user interface 414, or automatically in accordance with a schedule or occurrence of an event, e.g. turn on at a particular time of day or when a door of the hangar opens.

At block 810, upon being turned on, the controller 402 activates each of its associated measurement modules 202a, 202b, 202c. To this end, the controller 402 sends a control signal to each of the sensors 214a, 214b, 214c and the motors 216a, 216b, 216c causing each to turned on. At this time, the sensors 214a, 214b, 214c begin to output laser pulses and the motors 216a, 216b, 216c begin to rotate the sensors.

At block 812, the controller 402 detects for a learning mode trigger. A learning mode trigger may correspond to a user operation, e.g., manually activating a learning switch or on-screen button on the user interface 414, or an occurrence of an event, e.g. turn on of the controller 402 or detection of movement or motion within the hangar. If a learning mode trigger is detected at block 812, the protection system 200 enters the learning mode 804; otherwise the protection system remains in the idle mode 802.

While in the learning mode 804, the protection system 200 creates one or more monitored planes 218a, 218b, 218c each relative to a physical surface 210a, 210b, 210c of the hangar. To this end, at block 814, each sensor 214a, 214b, 214c obtains baseline measurements 408a, 408b, 408c while rotating about an axis perpendicular to its respective physical surface at a rotation rate. The physical surfaces 210a, 210b, 210c may be walls of the hangar. As described above with reference to FIGS. 4 and 5, each of these baseline measurements 408a, 408b, 408c corresponds to a distance between the sensor 214a, 214b, 214c and an object impeding a beam transmitted by the sensor. These measurements 408a, 408b, 408c may be obtained every n degrees of rotation.

As also described above with reference to FIGS. 4 and 5, an object impeding a beam transmitted by a sensor 214a, 214b, 214c may be another structure of the facility, such as a second physical surface adjacent the first physical surface, a floor adjacent the first physical surface, or a ceiling adjacent the first physical surface. The object, however, is not necessarily a structure of the facility and may be, for example, a table, a cart, a shelf, etc. As also described above with reference to FIGS. 2 and 3, the sensor 214a, 214b, 214c is spaced apart from its respective physical surface such that the sensor beams travels along a path that does not impact its respective physical surface. For example, the sensor may be positioned relative to the physical surface so that the beam path is generally parallel to the first physical surface.

Returning to FIG. 8, the measurement modules 202a, 202b, 202c provides the baseline measurements to the learning module 204. At block 816, the learning module 204 creates a corresponding monitored plane 218a, 218b, 218c based on each set of baseline measurements. As described above with reference to FIG. 5, each monitored plane 218a, 218b, 218c is defined by a data set 410a, 410b, 410c that comprises instances of data points, where each data point includes one of the plurality of baseline measurements 408a, 408b, 408c and its corresponding angle parameter. These data set 410a, 410b, 410c basically define the perimeter of the monitored planes 218a, 218b, 218c.

At block 818, the controller 402 detects for a detection mode trigger. A detection mode trigger may correspond to a user operation, e.g., manually activating a detection switch or on-screen button on the user interface 414, or an occurrence of an event, e.g. completion of the learning mode 804. If a detection mode trigger is detected, the protection system 200 enters the detection mode 806.

While in the detection mode 806, the protection system 200 obtains subsequent measurements of the plurality of baseline measurements. To this end, at block 820, each sensor 214a, 214b, 214c obtains subsequent measurements 412a, 412b, 412c, while rotating about an axis perpendicular to the first physical surface at a rotation rate. As described above with reference to FIGS. 4 and 7, each of these subsequent measurements 412a, 412b, 412c corresponds to a distance between the sensor 214a, 214b, 214c and an object impeding a beam transmitted by the sensor. These measurements are obtained every n degrees of rotation.

At block 822, the detection module 206, evaluates one or more subsequent measurements 412a, 412b, 412c relative to corresponding one or more baseline measurements 408a, 408b, 408c to determine if a criterion indicative of an intrusion of a monitored plane 218a, 218b, 218c is satisfied. For example, the criterion may be satisfied when each of the one or more subsequent measurements 412a, 412b, 412c is less than a value that is based on its corresponding baseline measurement 408a, 408b, 408c. This value may be equal to one of the corresponding baseline measurement itself, or the corresponding baseline measurement plus a buffer measurement. Furthermore, the one or more subsequent measurements comprises a plurality of subsequent measurements that are obtained in sequence.

At block 824, if an intrusion is not present, the process returns to block 822 where the detection module 206 continues to evaluate one or more subsequent measurements 412a, 412b, 412c relative to corresponding one or more baseline measurements 408a, 408b, 408c to determine if the criterion indicative of an intrusion of a monitored plane 218a, 218b, 218c is satisfied. If, however, an intrusion state is present at block 824, the process proceeds to block 826, where the detection module 206 activates an alarm. To this end, the detection module 206 outputs a control signal to the alarm module 208a, 208b, 208c associated with the monitored plane 218a, 218b, 218c that was breached to activate the alarm.

Upon activation of an alarm module 208a, 208b, 208c, the process returns to block 822, where the detection module 206 continues to evaluate one or more subsequent measurements 412a, 412b, 412c relative to corresponding one or more baseline measurements 408a, 408b, 408c to determine if the criterion indicative of an intrusion of a monitored plane 218a, 218b, 218c is satisfied. To this end, the detection module 206 monitors the existing breach to determine if the breach persists, while also monitoring for new breaches. Regarding the existing breach, if current subsequent measurements 412a, 412b, 412c cause the detection module 206 to determine that the intrusion criterion is no longer satisfied, the process proceeds to block 828, where the previously activated alarm is deactivated.

At block 830, protection system 200 may return to the idle mode 802 upon a user operation, e.g., manually activating an idle switch or on-screen button on the user interface 414, or an occurrence of an event, e.g. after a pre-determined period of time.

Returning to FIG. 4, the controller 402 of the protection system 200 may include one or more processors 406 configured to access and execute computer-executable instructions stored in at least one memory 404. The processor 406 may be implemented as appropriate in hardware, software, firmware, or combinations thereof. Software or firmware implementations of the processor 406 may include computer-executable or machine-executable instructions written in any suitable programming language to perform the various functions described herein. The processor 406 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The controller 402 may also include a chipset (not shown) for controlling communications between the processor 406 and one or more of the other components of the controller. The processor 406 may also include one or more application-specific integrated circuits (ASICs) or application-specific standard products (ASSPs) for handling specific data processing functions or tasks.

The memory 404 may include, but is not limited to, random access memory (RAM), flash RAM, magnetic media storage, optical media storage, and so forth. The memory 404 may include volatile memory configured to store information when supplied with power and/or non-volatile memory configured to store information even when not supplied with power. The memory 404 may store various program modules, application programs, and so forth that may include computer-executable instructions that upon execution by the processor 406 may cause various operations to be performed. The memory 404 may further store a variety of data manipulated and/or generated during execution of computer-executable instructions by the processor 406.

The controller 402 may further include one or more network interfaces 416 that may facilitate communication between the controller and one or more measurement modules 202a, 202b, 202c and one or more alarm modules 208s, 208b, 208c using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 404 may store various program modules, application programs, and so forth that may include computer-executable instructions that upon execution by the processor 406 may cause various operations to be performed. For example, the memory 404 may include an operating system module (O/S) that may be configured to manage hardware resources such as the network interface 416 and provide various services to applications executing on the controller 402.

The memory 404 stores additional program modules such as the learning module 204 and the detection module 206, each of which includes functions in the form of logic and rules that respectively support and enable the learning and detection functions described above with reference to FIGS. 2-8. Although illustrated as separate modules in FIG. 4, one or more of the modules may be a part of or a submodule of another module.

The controller 402 and modules 204, 206 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of protecting against impact between a moving vehicle and a facility housing the moving vehicle, the method comprising:
   creating a first monitored plane relative to a first physical surface of the facility, the first monitored plane defined by a plurality of baseline measurements, wherein each of the plurality of baseline measurements: 1) corresponds to a distance between a sensor spaced apart from the first physical surface and an object impeding a beam transmitted by the sensor, and 2) is identified by an angle parameter;
   obtaining subsequent measurements of the plurality of baseline measurements;
   evaluating one or more subsequent measurements relative to corresponding one or more baseline measurements to determine if a criterion indicative of an intrusion of the first monitored plane is satisfied; and
   activating an alarm when the criterion is satisfied.

2. The method of claim 1, wherein the object impeding a beam transmitted by the sensor is one of a second physical surface adjacent the first physical surface, a floor adjacent the first physical surface, and a ceiling adjacent the first physical surface.

3. The method of claim 1, wherein the beam travels along a path that does not impact the first physical surface.

4. The method of claim 3, wherein the path is generally parallel to the first physical surface.

5. The method of claim 1, wherein creating a first monitored plane relative to a first physical surface comprises:
   rotating the sensor relative to the first physical surface at a rotation rate, and
   obtaining one of the plurality of baseline measurements every n degrees of rotation,
   wherein the angle parameter identifying a particular baseline measurement corresponds to the degree of rotation at which the particular baseline measurement was obtained.

6. The method of claim 5, wherein the sensor is rotated about an axis perpendicular to the first physical surface.

7. The method of claim 5, wherein obtaining subsequent measurements of the plurality of baseline measurements comprises:
   rotating the sensor relative to the first physical surface at the rotation rate, and obtaining a subsequent measurement at every degree of rotation corresponding to an n degree of rotation at which one of the plurality of baseline measurements was obtained.

8. The method of claim 1, wherein the criterion is satisfied when each of the one or more subsequent measurements is less than a value that is based on its corresponding baseline measurement.

9. The method of claim 8, wherein the value is equal to one of: the corresponding baseline measurement itself, or the corresponding baseline measurement plus a buffer measurement.

10. The method of claim 8, wherein the one or more subsequent measurements comprises a plurality of subsequent measurements that are obtained in sequence.

11. The method of claim 1, further comprising:
after activating the alarm, comparing the one or more subsequent measurements to the corresponding one or more baseline measurements to determine if the criterion indicative of the intrusion of the first monitored plane is no longer satisfied; and
deactivating the alarm when the criterion is no longer satisfied.

12. The method of claim 1, further comprising repeating the creating, obtaining, comparing, and initiating for a second physical surface of the facility that is adjacent the first physical surface.

13. A system for protecting against impact between a moving vehicle and a facility for housing the moving vehicle, the system comprising:
a measurement module spaced apart from a first physical surface of the facility and configured to:
rotate relative to the first physical surface; and
obtain a plurality of measurements, wherein each of the plurality of measurements corresponds to a distance between the measurement module and an object impeding a beam transmitted by the measurement module;
a learning module coupled to the measurement module and configured to:
receive a plurality of measurements from the measurement module corresponding to a plurality of baseline measurements;
associate an angle parameter with each of the plurality of baseline measurements; and
create a first monitored plane relative to the first physical surface, the first monitored plane defined by the plurality of baseline measurements and corresponding angle parameters; and
a detection module coupled to the measurement module and configured to:
obtain one or more measurements from the measurement module, each corresponding to a subsequent measurement;
associate an angle parameter with each of the one or more subsequent measurements;
evaluate the one or more subsequent measurements relative to one or more baseline measurements having a same angle parameter to determine if a criteria indicative of an intrusion of the first monitored plane is satisfied; and
output an alarm activation signal when the criteria is satisfied.

14. The system of claim 13, wherein the measurement module comprises:
a motor configured to rotate at a rotation rate; and
a sensor coupled to the motor and configured to output the beam every n degrees of rotation.

15. The system of claim 14, wherein the sensor is arranged relative to the first physical surface so that the beam travels along a path that does not impact the first physical surface.

16. The system of claim 15, wherein the path is generally parallel to the first physical surface.

17. The system of claim 13, further comprising a structure extending outward from the first physical surface and having an axis perpendicular to the first physical surface, wherein the measurement module rotates about the axis.

18. The system of claim 13, wherein the angle parameter associated with a baseline measurement by the learning module corresponds to the degree of rotation at which the baseline measurement was obtained.

19. The system of claim 13, wherein the angle parameter associated with a subsequent measurement by the detection module corresponds to the degree of rotation at which the subsequent measurement was obtained.

20. The system of claim 13, further comprising an alarm module coupled to the detection module and configured to activate in response to the alarm activation signal.

* * * * *